UNITED STATES PATENT OFFICE.

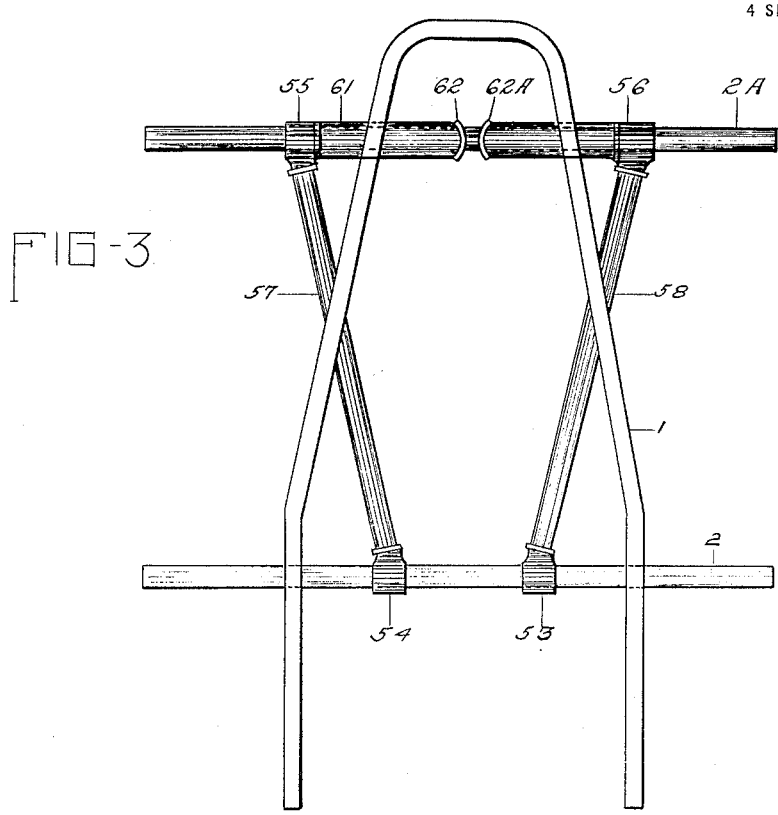
FIG-3
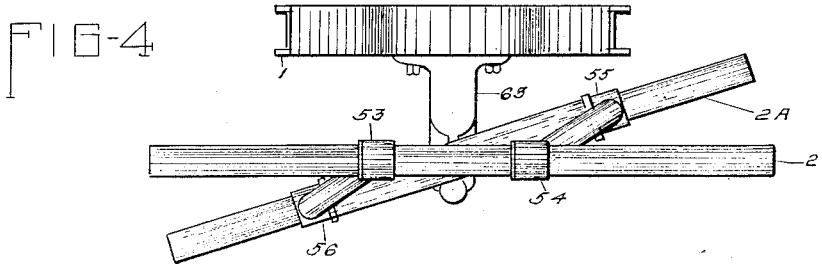
FIG-4
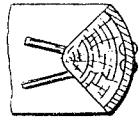  
FIG 9   FIG 8   FIG 7

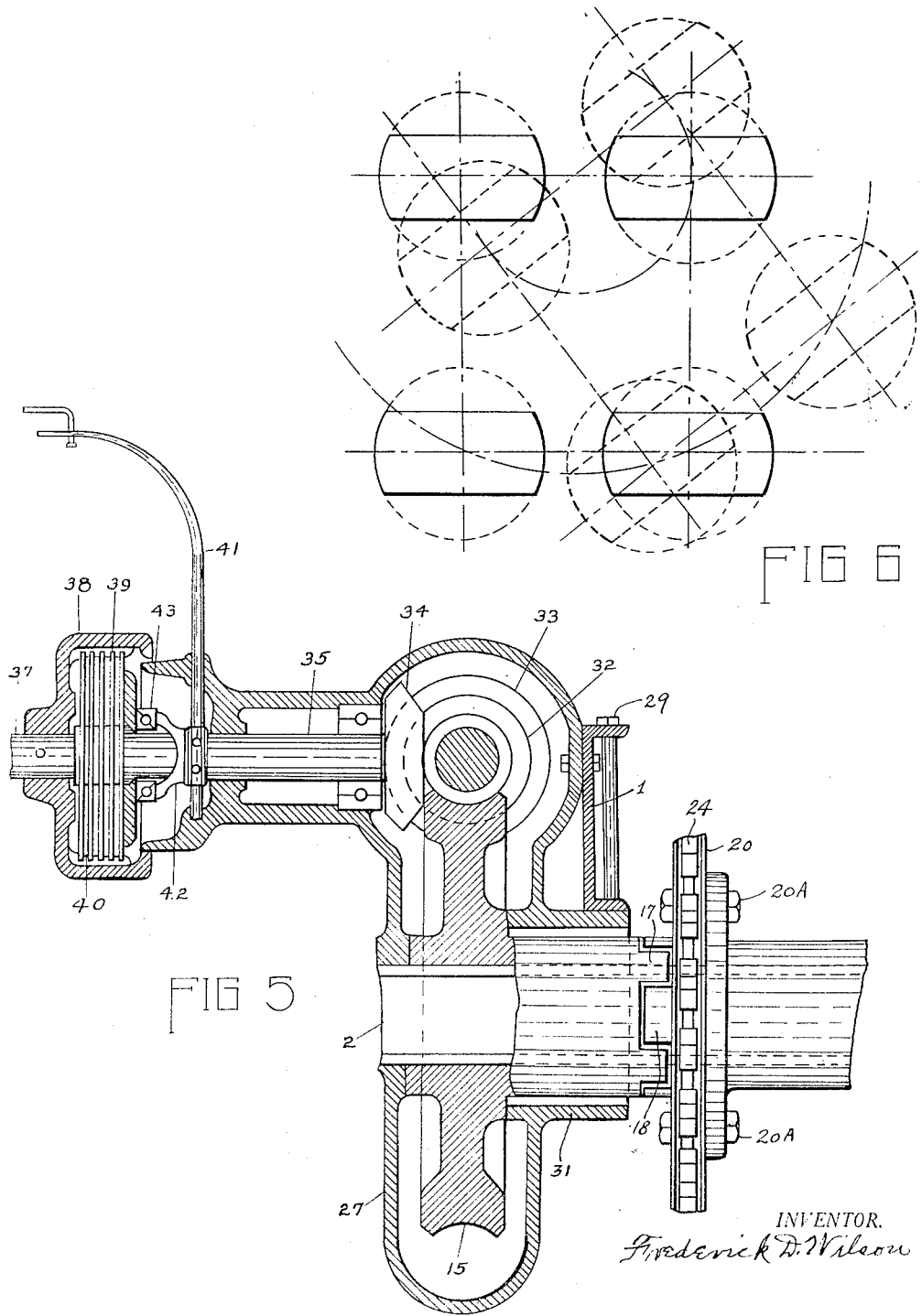

FRED D. WILSON, OF MOLINE, ILLINOIS.

TRACTOR.

1,375,882.   Specification of Letters Patent.   Patented Apr. 26, 1921.

Application filed February 4, 1919. Serial No. 274,911.

*To all whom it may concern:*

Be it known that I, FRED D. WILSON, a citizen of the United States, residing at Moline, in the county of Rock Island and State of Illinois, have invented certain new and useful Improvements in Tractors, of which the following is a specification, reference being had therein to the accompanying drawing.

This invention relates particularly to improvements in tractors of the class known as the four-wheel drive, quick turning type adapted to be driven by any suitable motive power and guided and otherwise controlled by means and mechanism under control of the operator, whether riding on the tractor or elsewhere.

The main object of this invention is to so arrange the combination of parts that the tractor may be started, turned or stopped at the will of the operator while riding on an implement or vehicle drawn behind, without changing the implement, or using any special device for attachment.

A further object is to provide a simple, durable driving mechanism, detachably connected to the motor in such a way as to be always under perfect control, while running in either direction and turning corners.

As before mentioned my main object is to arrange a combination of parts adapted to be entirely controlled, while in operation, from the seat of the implement drawn behind, and at the same time provide a strong, rigid, simple, cheaply manufactured frame, eliminating as far as possible all the objectionable joints, pivots, toggles and differentials, usually employed in four-wheeled tractors, and yet retain all of the advantages of quick turning features of these and similar machines. To accomplish this result, I use a wheel, the tire or rim of which is so shaped that in sliding sidewise, which it does in making a turn, it has a tendency to rise out of the soil instead of sinking as a flat tire does.

The advantage of a convexo-concave tire for this purpose, although apparent, will be hereinafter more fully described.

Another object is to provide automatic locking means for locking the wheels to prevent coasting on hills; and also, in making a square turn, to insure the two wheels on one side against further forward movement—it being understood that to make a turn it is necessary to cause the wheels on one side to rotate slower than those on the other side, and that the radius of the arc formed depends upon the difference in speed of the two pairs of wheels.

To accomplish this purpose without the use of special parts I have employed a type of power transmission which is in itself an automatic locking device and thereby performs a double function.

Another important object is to provide a clutch, or other power disconnecting means, which differs from the usual device in the respect that the controlling means, in this case, must be constantly acted upon by the operator, with the idea that in case the operator should, through accident or thoughtlessness, lose control of said controlling means, the tractor would stop. I have in mind the many accidents constantly occurring, due to the operator doing the wrong thing, or, forgetting to do the proper thing in time to avert accidents. My thought is, that if the operator is accustomed to pulling lightly upon these cords to engage the clutches, in case of unexpected trouble, the first act will be to release them. Or, in the case of a plow, on which the operator is seated, striking a stone or other immovable, unseen, object he would be thrown forward, and as a result involuntarily stop the forward movement of the tractor.

Another improvement of importance, to which I wish to call particular attention, is the means shown for connecting the worm gear to the driving wheel, permitting the transmission of power without the use of pins or keys which would, to a certain extent, weaken the axle if power was transmitted through it. Said means also tends toward speedy assembling or removal of the wheels.

Another object is the provision of a support for the clutch controlling cords which is detachably secured to a point as near over the connecting pivot, between the tractor and the implement, as convenient; and although I have shown this support secured to the main frame, I have in mind the possibility of future developments proving the necessity of securing this support to the draw-bar itself and shifting therewith when its lateral location is changed.

In order to make this invention more clearly understood I will refer to the accompanying drawings in which like numerals of reference indicate the same parts throughout the several figures.

Fig. 3 is a plan view of the main frame, axles and radius rods.

Fig. 4 is an end elevation of said frame.

Fig. 5 is an end elevation of the power transmission in detail showing method of connecting worm gear to driving sprocket and wheel.

Fig. 6 is a plan showing the circle described by each wheel while making what I term a square turn.

Fig. 7 is a section of a tire suitable for the purpose.

Fig. 8 is a section of another shaped tire, also suitable.

Fig. 9 is a section of another suitable shaped tire composed partly of cement for adding weight. This shape will prove particularly well adapted for soil composed principally of sand, owing to the tendency toward self-cleaning, as the sand can not collect inside the rim, but will slide outward.

Figure 1:
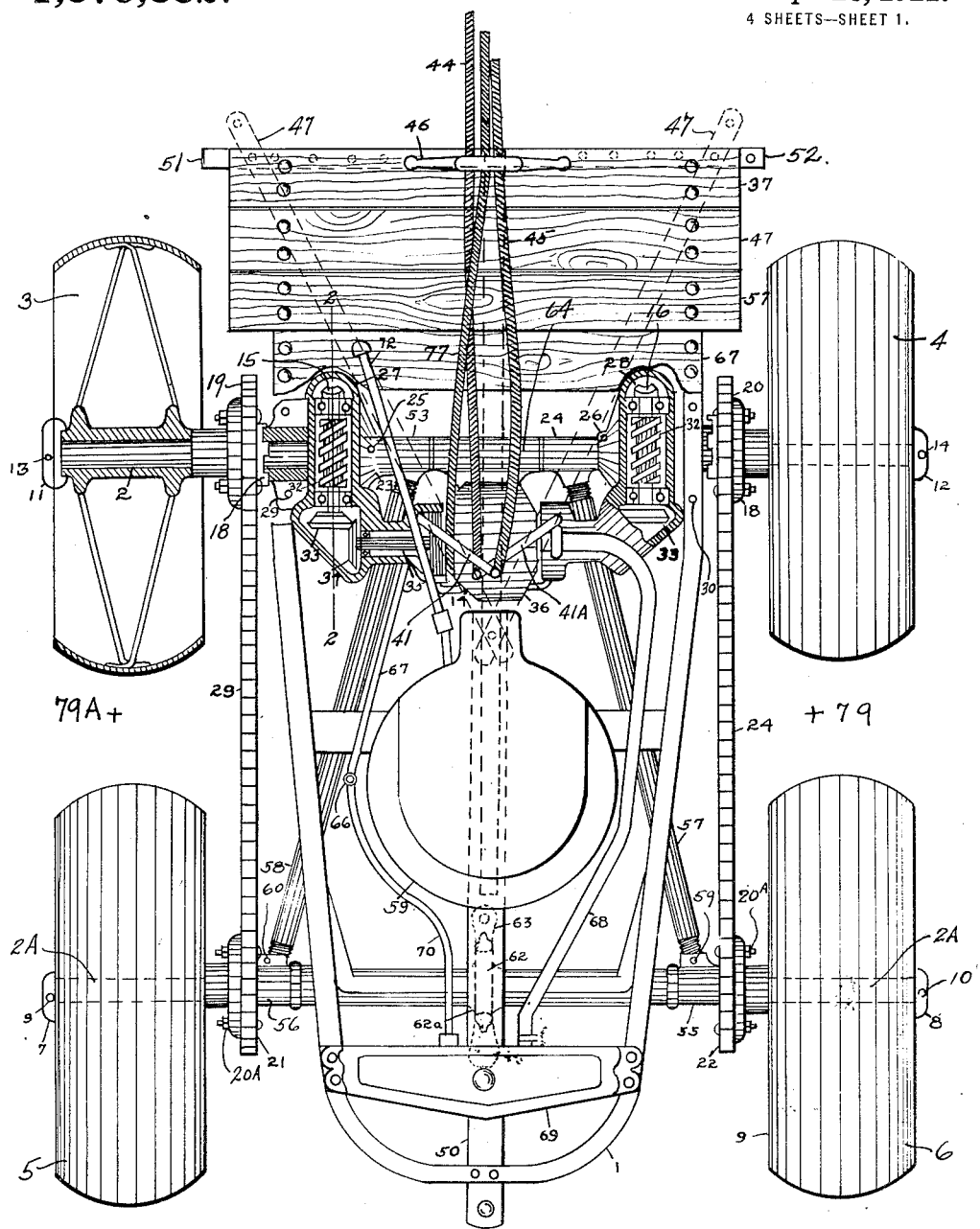
Figure 1, is a plan view of a tractor embodying the invention, showing clutch, driving wheel and part of driving mechanism in section.

Referring to Fig. 1. 1, is a suitable frame, conveniently a metal one, extending from front to rear, supported at three points, two of which are preferably at or near the rear, and one at or near the front, located in the center relative to the sides thereof.

Near the rear of said frame, at the beforementioned points, I have arranged crosswise, a rigid non-jointed axle, indicated at 2, Fig. 1, which extends a sufficient distance on each side, thereof, for the mounting of the wheels, 3 and 4. Forward of axle 2 and parallel therewith, is another non-jointed axle 2^A, preferably of the same length as axle 2, upon the ends of which are loosely mounted wheels 5 and 6, retained thereon by collars 7 and 8, which are secured by pins 9 and 10 extending through the axle.

The wheels 3 and 4 are retained in position by similar collars 11 and 12, said collars being fastened by pins 13 and 14.

Mounted for rotation on axle 2, inside the frame, are two worm wheels 15 and 16, both being shown in section, one on each side adjacent to the wheels 2 and 4, and each having a tubular portion, or hub, extending beyond the frame 1 (shown clearly in Fig. 5) having teeth, 17, formed in their ends, engaging similar teeth, 18, formed in the sprockets, 19 and 20; said sprockets being secured by bolts 20^A, or other detachable means to the wheels 3 and 4, sprocket 19 being secured to the hub of wheel 3 and sprocket 20, Fig. 1 secured to the hub of wheel 4.

Forward of sprockets 19 and 20, in alinement therewith, are sprockets 21 and 22, respectively, 21 being bolted to the hub of wheel 5 and 22 bolted to the hub of wheel 6, said sprockets 19 and 21 being connected by the sprocket chain 23, while 20 and 22 are connected by the chain 24.

Again referring to Fig. 1, secured to axle 2 by the pins 25 and 26 are casings 27 and 28, each serving the dual purpose of inclosing separate power transmitting mechanism and supporting the rear end of the main frame, the frame being secured by bolts at 29 and 30, each of said casings 27 and 28 having a tubular shaped portion, 31—Fig. 5—extending outward beyond the frame, the inside of which is finished to serve as bearings for the extended hubs of 15 and 16 respectively.

I prefer to use roller bearings both inside and outside the hubs of 15 and 16 and inside the hubs of each main wheel, 3, 4, 5, and 6.

Within each casing, 27 and 28, meshing with the worm gear therein, is journaled a worm indicated at 32, upon one end of which is secured a bevel gear 33, meshing with bevel gear 34, 34 being secured to shaft 35, journaled in a right angular extending portion of each of the casings 27 and 28. Numeral 36 indicates the motor, preferably a steam motor, but not necessarily so, as an internal combustion motor will serve my purpose equally well, provided, however, there be added the necessary reversing mechanism, and I wish it understood that I do not limit myself to any particular type of motor, except as a matter of convenience, as it is no part of this invention.

I have shown a rotary steam motor geared to shaft 37, Fig. 5, said shaft 37 being placed between, and in alinement with, the shaft 35 and a similar shaft journaled in the opposite casing 28.

Secured to each end of shaft 37 is a clutch, preferably of the multiple disk type, adapted to engage the inner end of the shaft 35 at the will of the operator.

The details of the preferred clutch, as shown in Fig. 5 are as follows: On each end of the shaft 37 is secured a casting 38 having an enlarged cylindrical portion extending toward, and encircling the inner end of the shaft 35.

On the inner periphery of the enlarged portion of casting 38, arranged parallel with the shaft 37, are splines, two or more in number, loosely engaging notches in disks 39, Fig. 5, preferably of steel; said disks each having a round hole in its center through which extends the squared end of shaft 35, said shaft being free to revolve therein.

On the inner squared end of the shaft 35, turning therewith, are disks 40 alternating with the disks 39, each fitted for slight longitudinal movement, with a square hole in the center; said disks 40 being of the largest possible diameter, allowing freedom of movement inside the splines carried by casting 38.

Journaled in a vertical bearing in each of the casings 27 and 28, adjacent to the shafts 35 and 35$^A$, are rods 41 and 41$^A$, respectively, having secured on the lower end of each, a clutch fork shown at 42, Fig. 5, the forked ends of which are arranged astride the shafts 35 and its companion shaft in a way allowing longitudinal movement for the application of pressure against the thrust bearing, 43, Fig. 5; said thrust bearing being free to slide on the shaft a sufficient distance to bring the disks 39 and 40 in close contact when 41 or 41$^A$ is rotated slightly.

The upper end of 41 and 41$^A$, Fig. 1, are bent to form cranks, each having provision at its outward end for the reception of cords, or ropes, 44 and 45; said cords being supported in a bracket, 46, detachably secured to the main frame as near as convenient to the hole in the rear end of the draw-bar 47.

Figure 2:
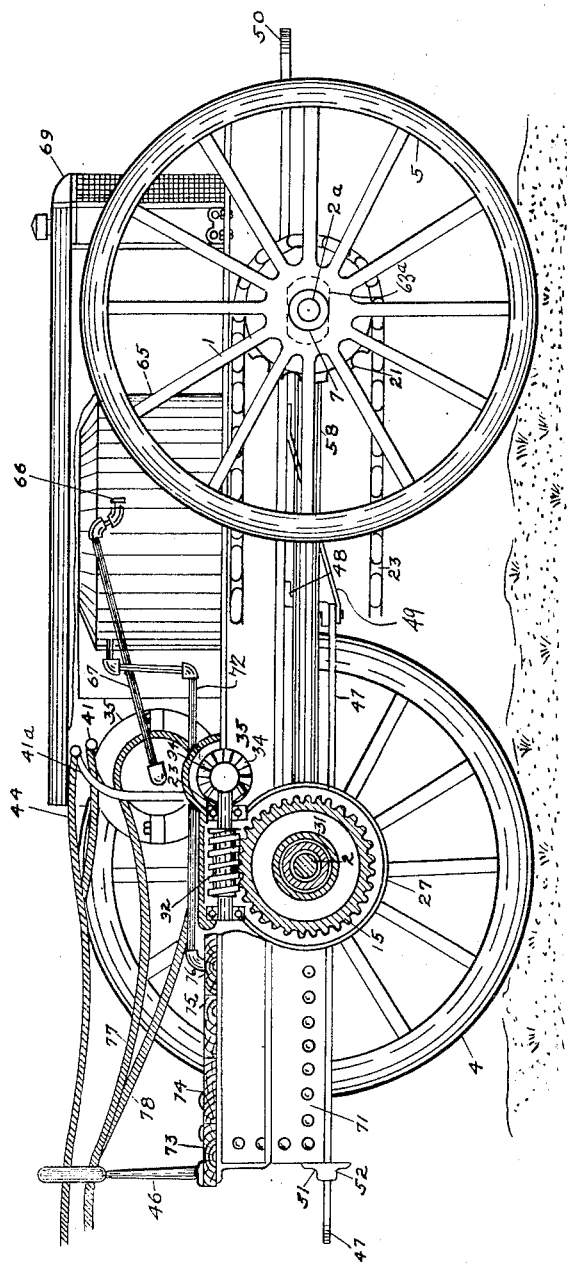
Fig. 2 is a side elevation with frame broken to show worm gear, worm gear casing and axle in section on the line 2—2 of Fig. 1.

It will be noted by referring to Fig. 2 that the draw-bar 47 is pivoted to the bracket 48 and brace 49, said 48 and 49 being secured to main frame center bar 50, said position of the pivot enabling the rear end of draw bar 47 to be manually adjusted each way from the center to suit the requirements of the different farm implements, and retained in the required position by means of pins inserted in the holes in the guides 51 and 52.

I desire it understood that I do not wish to be limited to attaching the support 46, for the cords 44 and 45, to the exact point shown, as my object is to support them directly, or as nearly so as convenient, over the pivot of connection with the following implement, as in this way the variation in the distance between the cranks, 41 and 41$^A$, and the operator, in making a turn, is reduced to a minimum, and for the above mentioned reason it may, in some instances, be desirable to attach 46 to the rear end of the draw-bar 47, in which case the relative length of the cords will remain the same whether the draw-bar is stationary in the guides 51 and 52 or allowed to swing freely from its pivot in 48 and 49.

In a tractor, guided as this one is, another advantage gained by pivoting the draw-bar at a nearly equal distance from each driving wheel and allowing the rear end of said draw-bar a limited amount of lateral freedom, is, should the tractor show a tendency to zigzag slightly, it will not be nearly so noticeable in the track of the implement as if the pivot is in the rear of the rear wheels.

Rotatably mounted on axle 2 inside the casings 27 and 28, are bearings 53 and 54, each having an internally threaded, tubular portion extending forwardly and outwardly. Similar bearings 55 and 56 are also rotatively mounted on the forward axle 2$^A$, 55 and 56 each having a threaded tubular portion extending rearwardly and inwardly; said bearings 54 and 55 being connected by the threaded rod 57, while 53 and 56 are connected by 58, which is also threaded at each end.

It will be noted that these radius rods 57 and 58 not only serve to keep the axles in a substantially parallel position, but are also adjustable tighteners for the driving chains 23 and 24, as by turning the rods and inserting the pins through the castings and rods, as shown at 59 and 60, the distance between the axles is altered.

Surrounding axle 2$^A$ and serving to retain in position the bearings 55 and 56, is a spacer 61, having collars, 62 and 62$^A$ secured thereto; said collars serving to retain 61 from end movement by engaging the sides of the bracket 63, which is securely fastened to the frame bar 50. The axle 2$^A$ is thus permitted a limited rocking movement in a vertical plane, as clearly shown in Fig. 4 of the drawings, so that the carrying wheels will accommodate themselves to the inequalities of the ground over which the tractor is passing.

It will be noted that the spacer, 61, passes through a slot, 63$^A$, Fig. 2, in 63, to accommodate the adjustment of the radius rods 57 and 58.

At the rear, surrounding axle 2, is a casting, 64, which also serves as a spacer for the bearings 53 and 54, having an arm extending forwardly, said arm becoming part of the frame by being bolted to the rear end of the bar 50, and also supporting the motor 36. 65 is a steam generator. 66 is the throttle valve controlling the flow of steam through the pipe, 67, leading to motor 36.

68 is the exhaust hose delivering exhaust steam to the condenser 69, the water from said condensed steam flowing through pipe 70 to supply tank 71, from which water may be supplied to generator through pipe 72.

73, 74, 75 and 76 represent the boards forming a platform for the convenience of the operator while driving the tractor idle.

77 and 78 are cords controlling the valve reversing mechanism of the rotary steam motor.

For further explanation of the control and operation of the tractor, we will assume the motor to be running in the required direction and the operator seated upon the implement drawn behind, holding the cord 44 in his right hand and cord 45 in his left, with the rear ends of the cords 77 and 78 tied to, or hung on, some convenient lever within reach.

When it is desired to start, straight ahead, both the cords 44 and 45 are pulled simultaneously slightly rotating the rods 41 and 41ᴬ which in turning cause their respective clutches to engage, resulting in the application of power to each of the wheels 3, 4, 5 and 6 as heretofore explained.

Desiring a slight change in the direction, to the right for instance, the operator relaxes slightly on the left hand cord, 45, which allows the right hand clutch to slip, slowing up the wheels 3 and 5, the natural result being that the wheels on the opposite side, 4 and 6, tend to run ahead, causing a twisting action of the entire tractor, thus changing its course.

If it is desired to turn to the left, the above mentioned action reversed, results in the desired effect.

To make what I term a square turn, in either direction, it is only necessary to entirely release the clutch on the side of the turn by letting its controlling cord hang slack, and at the same time hold the other cord taut, which will result in the tractor turning around the theoretical point 79 or 79ᴬ.

There is, however, some variation from the theoretical turning point in certain conditions of soil, and the position of the attached implement, but it is insignificant from a practical standpoint.

In making a square turn the advantages of a broad tire, convexo-concave in cross sections, will be readily appreciated, as in sliding sidewise, as the two stationary wheels do, it is my aim to have the edge of the rim above the surface of the ground even though the center of said rim is somewhat below, which creates a tendency for the wheel to rise to the surface if it happens to be otherwise.

The theoretical ideal wheel for this type of tractor, and what I consider is within the scope of my invention, would have a spherical outside periphery, but for practical reasons I have used the wheel shown at 3, Fig. 1, the close observation of which will disclose the similarity to a sphere minus two sides.

Regarding the automatic locking means heretofore mentioned, it is understood that the worm used in conjunction with the worm gear has threads of such a pitch that while the worm will turn the gear, the gear will not, without great friction at least, turn the worm, in which case the worm itself prevents the tractor from coasting when the clutch is out of engagement.

Another important feature is the fact that owing to the arrangement of the clutches, as will be noted, all the power of the motor is thrown on one side when the opposite clutch is disengaged and is not overloaded, in making a turn, as is the case where a brake band is used to retard one end of a two-piece shaft having a differential, which is sometimes done to gain the square turning feature.

Having thus described my invention, what I claim is:

1. In a tractor, the combination of four driving wheels, two separate power transmitting mechanisms, each having a line controlled clutch operating only when said line is taut and automatic locking means acting simultaneously with the release of said clutch, substantially as described.

2. In a tractor, the combination of four driving wheels, a motor, and two, separate, power transmitting mechanisms, and flexible means which when moved bodily, a limited distance, causes said mechanisms to operate, and means for automatically locking all of said wheels when said flexible means is released.

3. In a tractor, the combination of four driving wheels, the outside periphery of the rim of each being convex, two separate power transmitting mechanisms, each having a line controlled clutch operating when said line is taut, and releasing when the line is slackened, automatic means operating to lock two driving wheels simultaneously with the release of each clutch, substantially as shown and described.

4. In a tractor, the combination of four driving wheels, and means for automatically locking two of said wheels within each of two, separate, line controlled, power transmitting mechanisms, when said line is slackened, substantially as described.

5. In a tractor, the combination of a frame, a motor, four driving wheels and two, separate, power transmitting mechanisms, line controlled means connecting said mechanisms with said motor, and means, manually adjustable, upon the rear of the frame for supporting said line.

6. In a tractor, the combination of a frame supported at three points upon two, vertically parallel, axles, two driving wheels on each axle, a motor carried on said frame and power transmitting mechanism connecting the motor with each of said wheels, substantially as shown.

7. In a tractor, a frame supported upon two continuous, non-rotatable axles, so that said axles are capable of adjustment with relation to each other; driving wheels mounted on said axles; a motor; power transmitting mechanism imparting movement from the motor to the driving wheels; and means for holding said axles in adjusted positions with relation to each other.

8. In a tractor, a frame supported at three points upon two, continuous, non-rotating axles, four driving wheels mounted on said axles, a motor and power transmitting mechanism connecting the motor with each wheel, and automatic locking means acting on two of said wheels, independent of the rest, when the power is disconnected, substantially as shown and described.

9. In a tractor, a frame, front and rear driving wheels, the tires of each being convexo-concave, a motor and two power transmitting mechanisms, including two line controlled friction clutches, operative at will, connecting the motor with the wheels and automatic means acting to prevent coasting when the transmitting mechanism is disconnected.

10. In a tractor, a frame, a rigidly constructed axle secured to said frame, a rigidly constructed axle pivoted for vertical movement also secured to said frame, carrying and driving wheels, a motor, power transmitting mechanism, including automatic locking means, acting on some of said wheels or all of said wheels at the will of the operator.

11. In a tractor, a plurality of driving and supporting wheels on each side of the longitudinal axis, the wheels on one side being operatively independent of those upon the other side, a source of power, and an independent power transmitting mechanism, including a friction clutch and automatic locking means, connecting said source of power in driving relation with the wheels on each side, and a rein, which while taut, controls the driving relation of said source of power to said wheels.

12. In a tractor, a frame supported at three points and one of said points being adjustable, longitudinally, a plurality of driving and supporting wheels on each side of the longitudinal axis, a source of power, and an independent power transmitting mechanism connecting said source of power in driving relation with the wheels on each side.

13. In a tractor, front and rear wheels, a frame supported at three points, upon axles mounted in the wheels, and one of said points being adjustable, longitudinally, a source of power, and means of transmitting power to each rear wheel independently and mechanism for applying power to the front wheels from their respective rear wheels.

14. In a tractor, the combination of a plurality of driving wheels on each side of the longitudinal axis, two, separate power transmitting mechanisms each having a line controlled frictional driving means, when said line is taut, and automatic means operating to lock all the wheels on each side simultaneously with the release of said frictional driving means.

In testimony whereof, I affix my signature.

FRED D. WILSON.